United States Patent
Wang et al.

(10) Patent No.: US 8,781,320 B2
(45) Date of Patent: Jul. 15, 2014

(54) AUTOMATICALLY SWITCHED OPTICAL NETWORK AND METHOD FOR DATA TRANSMISSION IN THE NETWORK

(75) Inventors: Dajiang Wang, Shenzhen (CN); Zhenyu Wang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 839 days.

(21) Appl. No.: 12/743,432

(22) PCT Filed: Nov. 21, 2007

(86) PCT No.: PCT/CN2007/071111
§ 371 (c)(1),
(2), (4) Date: May 18, 2010

(87) PCT Pub. No.: WO2009/065274
PCT Pub. Date: May 28, 2009

(65) Prior Publication Data
US 2010/0266278 A1      Oct. 21, 2010

(51) Int. Cl.
*H04J 14/00* (2006.01)
*H04L 12/56* (2006.01)
*H04Q 11/00* (2006.01)

(52) U.S. Cl.
CPC ........... *H04L 45/22* (2013.01); *H04L 45/28* (2013.01); *H04Q 2011/0073* (2013.01); *H04Q 11/0062* (2013.01); *H04L 45/04* (2013.01)
USPC .................................. 398/57; 398/45; 398/56

(58) Field of Classification Search
USPC ................ 398/10, 12, 17, 19, 45, 56, 57
See application file for complete search history.

(56) References Cited

U.S. PATENT DOCUMENTS

| 8,199,649 | B2* | 6/2012 | McAllister et al. | 370/235 |
| 2003/0218982 | A1* | 11/2003 | Folkes et al. | 370/238 |
| 2006/0026225 | A1* | 2/2006 | Canali et al. | 709/200 |

(Continued)

FOREIGN PATENT DOCUMENTS

| CN | 1476257 A | 2/2004 |
| CN | 1859260 A | 11/2006 |
| CN | 1953397 A | 4/2007 |
| EP | 1 887 733 | 2/2008 |

OTHER PUBLICATIONS

International Search Report for PCT/CN2007/071111, Prepared by the Chinese Patent Office, Dated Jul. 31, 2008, 4 Pages.

*Primary Examiner* — Dzung Tran
(74) *Attorney, Agent, or Firm* — Brooks Kushman P.C.

(57) ABSTRACT

An automatically switched optical network includes several areas of a transmission plane and a control plane, and a method for data transmission in the network includes that when the control plane has detected at least one partition of an area separated from other partitions of the area, a route over area is realized between the separated partitions of the area by the way of virtual link in the area. When several partitions exist in a certain area of the network, which can not be connected with each other through routes within the area, and the data transmission can not be performed between these partitions, a hierarchical route in the case of the area of ASON transmission plane being parted is realized by the method, so when the several separated partitions are caused by link fault in a certain area, the hierarchical route over area can be realized for the partitions of the area.

8 Claims, 3 Drawing Sheets

(56) References Cited

U.S. PATENT DOCUMENTS

| | | |
|---|---|---|
| 2008/0031263 A1* | 2/2008 | Ervin et al. .................. 370/397 |
| 2008/0031619 A1* | 2/2008 | Xu et al. ........................... 398/2 |
| 2008/0095176 A1* | 4/2008 | Ong et al. .................... 370/400 |
| 2008/0170854 A1* | 7/2008 | Li .................................. 398/45 |

\* cited by examiner

US 8,781,320 B2

AUTOMATICALLY SWITCHED OPTICAL NETWORK AND METHOD FOR DATA TRANSMISSION IN THE NETWORK

CROSS-REFERENCE TO RELATED APPLICATION

This application is the U.S. national phase of PCT Appln. No. PCT/CN2007/071111 filed Nov. 21, 2007, the disclosure of which is incorporated in its entirety by reference herein.

TECHNICAL FIELD

The present invention relates to the field of optical communication, and more particularly, to an automatically switched optical network and a method for transmitting data in the network.

TECHNICAL BACKGROUND

In the prior art, in section 6.2 of the G.8080 standard of the ITU-T for ITU Telecommunication Standardization Sector (ITU-T), an automatically switched optical network (ASON) transport plane is divided into routing areas and subnets, where one routing area may be composed of a number of sub-areas or subnets. The function of hierarchical routing may be implemented on the ASON transport plane by dividing routing areas. The G.17715 standard describes systematically the implementation of the hierarchical routing, the main idea of which is to convert the route between a pair of nodes belonging to different areas respectively into hierarchical routes. As shown in FIG. 1, the route from a node A in an area 1 to a node B in an area 4 is divided into an intra-area route from the node A to the boundary of the area 1, an inter-area route from the area 1 to the area 4 and an intra-area route from the boundary of the area 4 to the node B. In this figure, the intra-area route is indicated by a thin line and the inter-area route is indicated by a thick line. Thus, route-finding of a cross-area connection can be implemented by the inter-area route provided by a node on the boundary of the area 1 and the intra-area route to the node B provided by a node on the boundary of the area 4 on the other side, provided that the node A has the route to the boundary of the area 1.

Therefore, the advantage of dividing areas is that details of network topology outside the areas can be shielded, each area is only required to maintain its own internal network topology, and by link aggregation, connections between the areas are maintained and inter-area routes are generated, thereby decreasing the consumption of the CPU of a ASON node in calculating topology routes and increasing the convergence speed of the network.

The concept of area hierarchical routing of the ASON transport plane is mentioned in both the G.67715 standard and the G.8080 standard, but neither of the standards involves a reference to a partitioned area. In fact, the area hierarchical routing of the ASON transport plane is similar to the area routing aggregation theory of the Open Shortest Path First (OSPF) standard routing protocol. The OSPF standard protocol RFC2328 discusses specially the concept of a partitioned area in section 3.7 "Partitions of areas", and provides measures to solve the problem of partitioned area connectivity. It is discovered by comparison that for the area hierarchical routing theory of the ASON transport plane, it is necessary to consider an implementation method of the hierarchical routing in the case of a partitioned area.

SUMMARY OF THE INVENTION

A technical problem to be solved by the present invention is to provide an automatically switched optical network and a method for transmitting data in the network, such that when some area in the network has some portions that can not be connected with one another by an intra-area route, connectivity among these portions can be achieved.

In order to solve the above technical problem, the present invention provides an automatically switched optical network, comprising: a number of areas on a transport plane, and a control plane, wherein, at least one portion of an area is isolated from the other portions of the area, then the area is a partitioned area and each portion of the partitioned area is a partition of the area; and the control plane is configured to realize a cross-area route between the isolated partitions of the area by a virtual link.

Furthermore, the control plane realizes a cross-area route between the isolated partitions of the area by the virtual link means:

when the control plane detects that an area has become a partitioned area due to a link failure, the control plane configures a virtual link at an boundary of each partition of the area respectively, sets up a soft permanent connection (SPC) service connection between a node in any one partition of the area and another node in any other partition of the area, and obtains a route between the nodes in the two partitions of the area through the virtual link.

Furthermore, service data carried by the SPC service connection between the nodes in the two partitions of the area is transmitted transparently over the virtual link passed.

Furthermore, the route between the nodes in the two partitions of the area is logically an intra-area route, but physically crosses a number of areas.

Furthermore, the at least one portion of an area being isolated from the other portions of the area means:

the at least one portion of the area can not be connected with the other portions of the area by an intra-area route.

The present invention also provides a method for transmitting data in an automatically switched optical network, applied for data transmission among a number of portions of an area in the network when the portions are isolated from one other, each of the portions being referred to as a partition of the area; the method comprising:

when a control plane detects that at least one portion of an area is isolated from the other portions of the area, realizing a cross-area route between the isolated partitions of the area by a virtual link.

Furthermore, realizing a cross-area route between the isolated partitions of the area by the virtual link means:

the control plane configuring a virtual link at an boundary of each partition of the area, setting up a soft permanent connection (SPC) service connection between nodes in any two partitions of the area when data needs to be transmitted between the nodes in the two partitions of the area, and obtaining a route between the nodes in the two partitions of the area through the virtual link.

Furthermore, the route between the nodes in the two partitions of the area is logically an intra-area route, but physically crosses a number of areas.

Furthermore, the method further comprises:

transmitting service data carried by the SPC service connection between the nodes in the two partitions of the area transparently over the virtual link passed.

Furthermore, the portions being isolated from one other means that the portions can not be connected with one another by an intra-area route.

The technique scheme of the present invention provides a method for implementing hierarchical routing in the case of a partitioned area on the ASON transport plane, such that when some portions of an area can not be connected with one another by an intra-area route due to a link failure in the area, cross-area hierarchical routing of the partitioned area can be implemented.

PREFERRED EMBODIMENTS OF THE INVENTION

Figure 1:
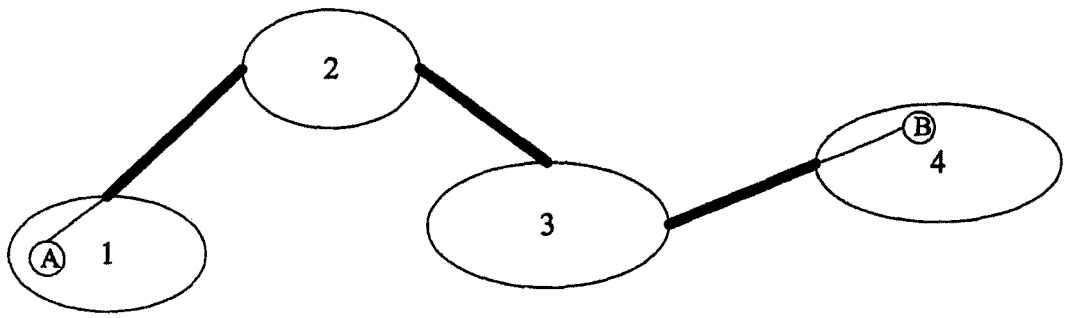
FIG. 1 is a schematic diagram of cross-area hierarchical routing in the prior art.

The technical scheme of the present invention will be described in detail below in conjunction with the accompanying drawings and embodiments.

The present invention provides an automatically switched optical network (ASON) including a number of areas. When at least one portion of an area is isolated from the other portions of the area due to a link failure inside the area, the area becomes a partitioned area of which each portion is referred to as a partition of the area; and the control plane is used to realize a cross-area route between the isolated partitions of the area by a virtual link.

The concept of a partitioned area of the ASON transport plane is presented first in the present invention. The partitioned area refers to an area of which at least one portion is isolated from the other portions due to a link failure inside the area, the at least one portion of the area being isolated from the other portions means that the at least one portion of the area can not be connected with the other portions by an intra-area route. If an area becomes a partitioned area and any partition of the area can be reconnected with one another through other areas, then in theory connections can still be set up and communications can be kept between nodes or subnets in the partitions of the area, except that in this partitioned area, a service connection from one partition of the area to another is physically no longer an intra-area path but has to be realized with an inter-area path.

The present invention further presents a method for realizing a cross-area route between nodes in partitions of a partitioned area by a virtual link. When the control plane detects in real time that an area has become a partitioned area due to a link failure, a passage between any partition of the area and any other partition of the area can be formed logically by configuring a virtual link at the boundary of each partition of the partitioned area respectively; thus, the transport plane topology between the two partitions of the area can be shielded by the virtual link passage between them, thereby achieving the direct connection between them. In such a case, a soft permanent connection (SPC) service connection between nodes in the two partitions of the area is set up to obtain a route between the nodes in the two partitions of the area through the virtual link. The obtained route is logically still an intra-area route, the two ends of the virtual link are considered to be adjacent nodes, and service data carried by the SPC service connection will be transmitted transparently over the virtual link passed.

The present invention further provides a method for transmitting data in the ASON, applied for data transmission between some portions of an area in the network—the portions are isolated from one another, i.e., the portions can not be connected by an intra-area route—namely data transmission between partitions of a partitioned area; the partitioned area refers to an area of which at least one portion is isolated from the other portions due to a link failure inside the area; each portion of the partitioned area is referred to as a partition of the area.

Figure 2:
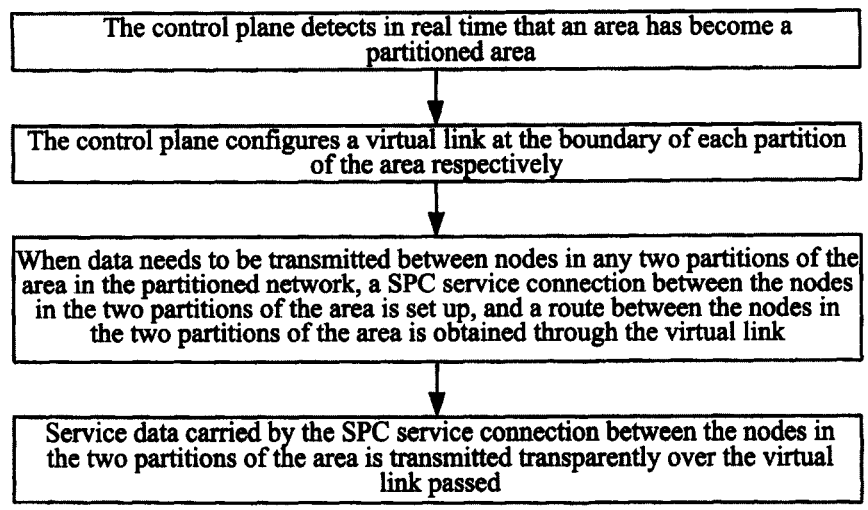
FIG. 2 is a flow chart of a specific embodiment of a method for transmitting data in an automatically switched optical network in accordance with the present invention.

The method is shown in FIG. 2 and comprises the following steps:

A. The control plane detects in real time that an area has become a partitioned area.

In this step, the control plane detects in real time that an area has become a partitioned area means that the control plane detects in real time that at least one portion of an area is isolated from the other portions of the area due to a link failure.

B. The control plane configures a virtual link at the boundary of each partition of the area respectively. By this step, a passage between any partition of the area and any other partition of the area is formed logically.

C. When data needs to be transmitted between nodes in any two partitions of the area in the partitioned network, a SPC service connection between the nodes in the two partitions of the area is set up, and a route between the nodes in the two partitions of the area is obtained through the virtual link.

D. Service data carried by the SPC service connection between the nodes in the two partitions of the area is transmitted transparently over the virtual link passed.

The prevent invention will be further described in conjunction with an application example.

Figure 3A:
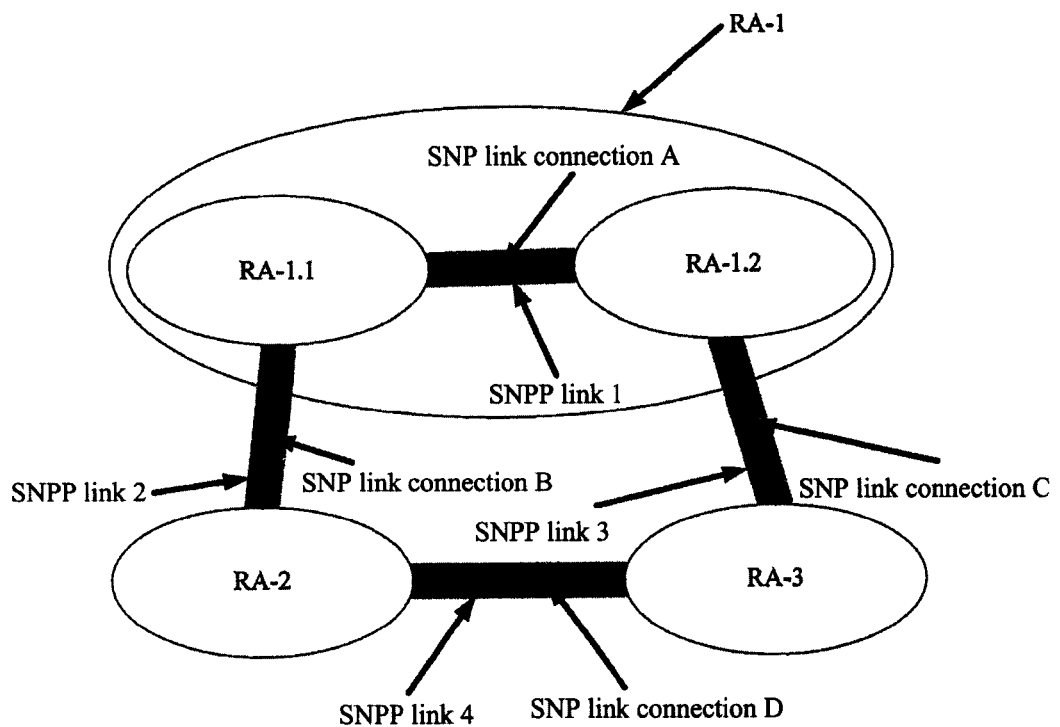
FIG. 3(a) and (b) are schematic diagrams of partitioned area scenarios in an application example of the present invention.

As shown in FIG. 3(a), area RA-1, area RA-2 and area RA-3 are three transport areas independent of one another. The area RA-1 consists of two portions: RA-1.1 and RA-1.2, which are connected by a subnet node point (SNP) link connection A in a unique subnet node point group (SNPP) link 1. At the meantime, RA-1.1 and RA-2 are connected by a SNP link connection B in a SNPP link 2, RA-1.2 and RA-3 are connected by a SNP link connection C in a SNPP link 3, and RA-2 and RA-3 are connected by a SNP link connection D in a SNPP link 4.

Figure 3B:
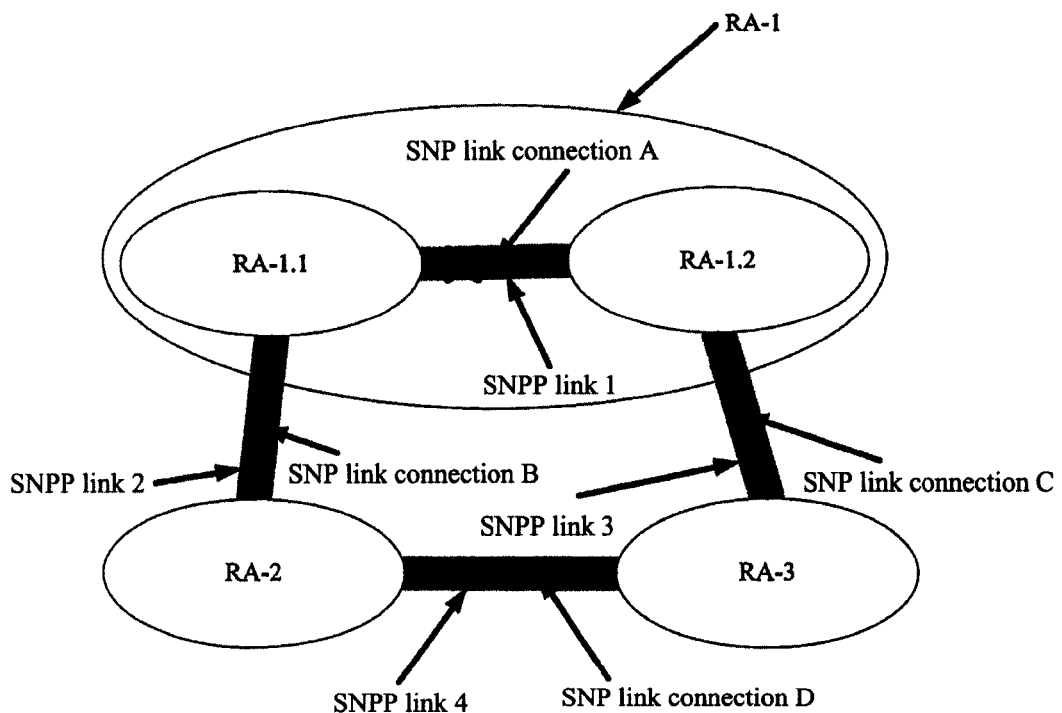

When failure occurs in the link 1, the area RA-1 is partitioned into two portions: RA-1.1 and RA-1.2, and as shown in FIG. 3(b), at this time, the two partitions of the area are still kept connected physically by the areas RA-2 and RA-3. However, because both RA-1.1 and RA-1.2 belong to the area RA-1, the connection route between a node in RA-1.1 and a node in RA-1.2 is always considered to be an intra-area route. According to the discussion of hierarchical routing in G.8080 and G.7715 in the prior art, the route between the nodes in RA-1.1 and RA-1.2 will never be acquired by an inter-area route.

Figure 4:
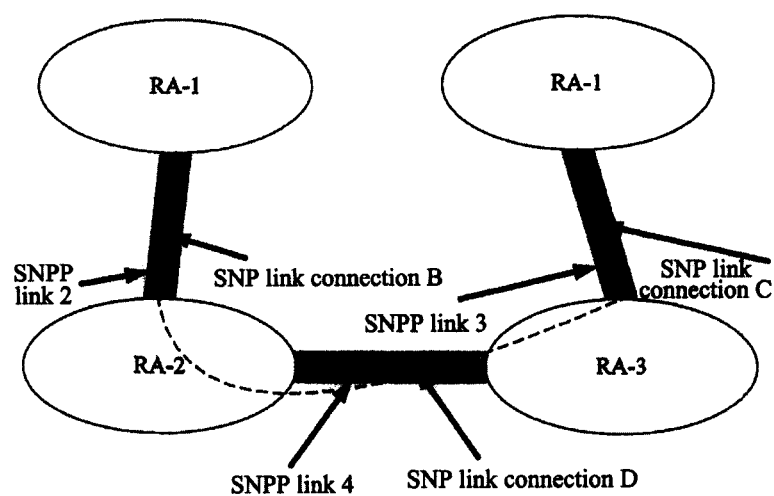
FIG. 4 is a schematic diagram of a virtual link between partitioned areas in an application example of the present invention.

In regard to this situation, the present invention presents a method for realizing a cross-area route between nodes in RA-1.1 and RA-1.2 by a virtual link. When the control plane detects in real time that the situation shown in FIG. 3(b) takes place, a passage between RA-1.1 and RA-1.2 can be formed logically by configuring a virtual link at boundaries of RA-1.1 and RA-1.2 respectively. As shown in FIG. 4, the virtual link is indicated by a dashed line and the virtual link includes the SNP link connection B between RA-1.1 and RA-2, the SNP link connection D between RA-2 and RA-3 and the SNP link connection C between RA-1.2 and RA-3. Thus, the transport plane topology between RA-1.1 and RA-1.2 can be shielded by the virtual link passage, thereby realizing a direct connection between them.

In such a case, a soft permanent connection (SPC) service connection between the nodes in RA-1.1 and RA-1.2 is set up to obtain a route through the virtual link. The obtained route is logically still an intra-area route, the two ends of the virtual link are considered to be adjacent nodes, and the service carried by the connection will be transmitted transparently over the virtual link passed.

Specific implementation of the virtual link may depend on the transport device used in practice. Common methods include transmitting a service directly and transparently by a tunnel, setting up a dedicated permanent connection (PC) or SPC connection between the two ends of the virtual link to realize the virtual link passage, etc., which will not be enumerated herein.

Of course, various other embodiments in accordance with the present invention may be used. Those skilled in the art may make various corresponding modifications and variations according to the present invention, without departing from the spirit and essence of the present invention. All such corresponding modifications and variations shall fall into the protection scope defined by the appended claims.

Industrial Applicability

The technique scheme of the present invention provides a solution to the problem that data can not be transmitted between some portions of an area in a network when these portions can not be connected with one another by an intra-area route, and provides a method for implementing hierarchical routing in the case of a partitioned area on the ASON transport plane such that when an area has some portions that are isolated from one another due to a link failure therein, cross-area hierarchical routing of the partitioned area can be implemented.

What we claim is:

1. An automatically switched optical network, comprising: a number of areas on a transport plane, and a control plane, wherein,
    at least one portion of an area is isolated from the other portions of the area, where the area is referred to as a partitioned area and each portion of the partitioned area is referred to as a partition of the area; and
    the control plane is configured to realize a cross-area route between the isolated partitions of the area by a virtual link;
    wherein the control plane realizes a cross-area route between the isolated partitions of the area by the virtual link means:
    when the control plane detects that an area has become a partitioned area due to a link failure, the control plane configures a virtual link at an boundary of each partition of the area respectively, sets up a soft permanent connection (SPC) service connection between a node in any one partition of the area and another node in any other partition of the area, and obtains a route between the nodes in the two partitions of the area through the virtual link.

2. The automatically switched optical network according to claim 1, wherein service data carried by the SPC service connection between the nodes in the two partitions of the area is transmitted transparently over the virtual link passed.

3. The automatically switched optical network according to claim 1, wherein the route between the nodes in the two partitions of the area is logically an intra-area route, but physically crosses a number of areas.

4. The automatically switched optical network according to claim 1, wherein the at least one portion of an area being isolated from the other portions of the area means:
    the at least one portion of the area can not be connected with the other portions of the area by an intra-area route.

5. A method for transmitting data in an automatically switched optical network, applied for data transmission among a number of portions of an area in the network when the portions are isolated from one other, each of the portions being referred to as a partition of the area; the method comprising:
    when a control plane detects that at least one portion of an area is isolated from the other portions of the area, realizing a cross-area route between the isolated partitions of the area by a virtual link;
    wherein realizing a cross-area route between the isolated partitions of the area by the virtual link means:
    the control plane configuring a virtual link at an boundary of each partition of the area, setting up a soft permanent connection (SPC) service connection between nodes in any two partitions of the area when data needs to be transmitted between the nodes in the two partitions of the area, and obtaining a route between the nodes in the two partitions of the area through the virtual link.

6. The method according to claim 5, wherein the route between the nodes in the two partitions of the area is logically an intra-area route, but physically crosses a number of areas.

7. The method according to claim 5, further comprising:
    transmitting service data carried by the SPC service connection between the nodes in the two partitions of the area transparently over the virtual link passed.

8. The method according to claim 5, wherein the portions being isolated from one other means that the portions can not be connected with one another by an intra-area route.

* * * * *

UNITED STATES PATENT AND TRADEMARK OFFICE
CERTIFICATE OF CORRECTION

PATENT NO. : 8,781,320 B2  Page 1 of 1
APPLICATION NO. : 12/743432
DATED : July 15, 2014
INVENTOR(S) : Dajiang Wang et al.

It is certified that error appears in the above-identified patent and that said Letters Patent is hereby corrected as shown below:

In the Claims

Column 6, Line 33, Claim 5:

After "configuring a virtual link at"
Delete "an" and insert -- a --.

Signed and Sealed this
Twenty-first Day of October, 2014

Michelle K. Lee
*Deputy Director of the United States Patent and Trademark Office*